(12) United States Patent
Wang et al.

(10) Patent No.: US 8,213,518 B1
(45) Date of Patent: Jul. 3, 2012

(54) MULTI-THREADED STREAMING DATA DECODING

(75) Inventors: Jason N. Wang, San Jose, CA (US); Milan Mehta, San Jose, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1511 days.

(21) Appl. No.: 11/627,867

(22) Filed: Jan. 26, 2007

Related U.S. Application Data

(60) Provisional application No. 60/863,767, filed on Oct. 31, 2006.

(51) Int. Cl.
*H04N 7/12* (2006.01)
*H04N 11/02* (2006.01)

(52) U.S. Cl. ............... 375/240.25; 375/240.28; 348/721

(58) Field of Classification Search ............. 375/240.25, 375/240.16, 240.23; 712/215; 340/240.28; 348/721
See application file for complete search history.

(56) References Cited

U.S. PATENT DOCUMENTS

| | | | | |
|---|---|---|---|---|
| 5,502,493 | A * | 3/1996 | Meyer ....................... | 375/240.26 |
| 6,078,695 | A | 6/2000 | Kadono | |
| 6,172,621 | B1 * | 1/2001 | Iwata ............................. | 341/50 |
| 6,665,340 | B1 | 12/2003 | Kimoto | |
| 7,634,776 | B2 * | 12/2009 | Parameswaran et al. ..... | 718/105 |
| 7,760,916 | B2 | 7/2010 | Sato | |
| 7,983,342 | B2 * | 7/2011 | Saha et al. ............... | 375/240.23 |
| 2003/0099294 | A1 | 5/2003 | Wang et al. | |
| 2004/0042673 | A1 | 3/2004 | Boon | |
| 2005/0262510 | A1 * | 11/2005 | Parameswaran et al. ..... | 718/105 |
| 2005/0281334 | A1 | 12/2005 | Walker et al. | |
| 2007/0171975 | A1 * | 7/2007 | Smith et al. ............... | 375/240.13 |
| 2008/0313484 | A1 * | 12/2008 | Ratakonda et al. ........... | 713/375 |

OTHER PUBLICATIONS

U.S. Appl. No. 60/863,767, filed Oct. 31, 2006.
U.S. Appl. No. 12/210,925, filed Sep. 15, 2008.
U.S. Appl. No. 12/210,915, filed Sep. 15, 2008.
Non-Final Office Action dated Sep. 20. 2011 for U.S. Appl. No. 12/210,925.
Non-Final Office Action dated Sep. 29, 2011 for U.S. Appl. No. 12/210,912.
Draft of Version 4 of H.264/AVC (ITU-T Recommendation H.264 and ISO/IEC 14496-10 (MPEG-4 part 10) Advanced Video Coding) by Gary Sullivan, Thomas Wiegand and Ajay Luthra, Joint Video Team (JVT) of ISO/IEC MPEG & ITU T VCEG (ISO/IEC JTC1/SC29/WG11 and ITU T SG16 Q.6), 14th Meeting: Hong Kong, CH Jan. 18-21, 2005.

* cited by examiner

*Primary Examiner* — Zachary A Davis
(74) *Attorney, Agent, or Firm* — Joshua D. Isenberg; JDI Patent

(57) ABSTRACT

Streaming data may be decoded by dividing a process for decoding the streaming data into two or more tasks based on data dependencies between the two or more tasks. The two or more tasks may be executed in parallel on three or more processors in a way that balances a processing load of executing the two or more tasks among the three or more processors.

33 Claims, 11 Drawing Sheets

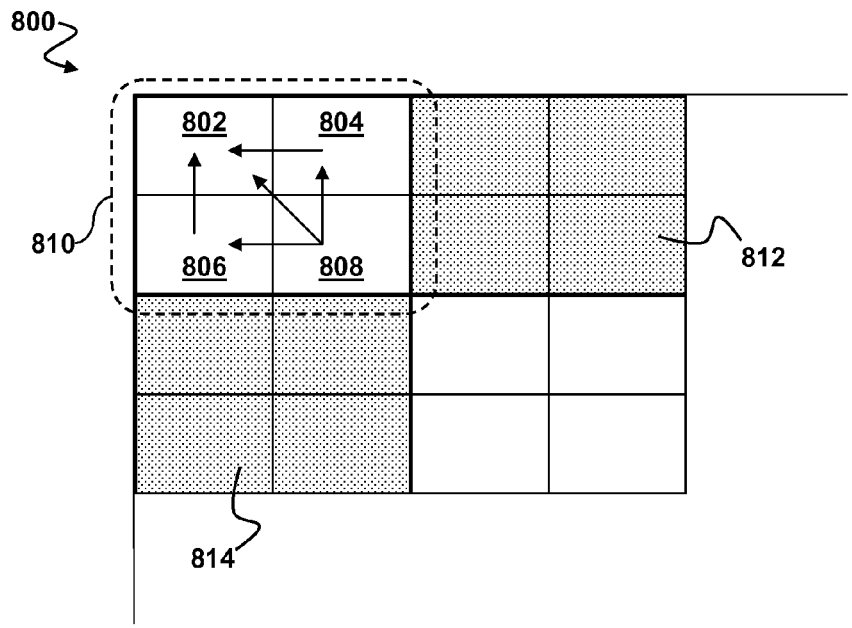

| MB Group 0<br>De-blocking sub-task (0) | MB Group 1<br>De-blocking sub-task (0) | MB Group 2<br>De-blocking sub-task (0) | MB Group 3<br>De-blocking sub-task (0) |
|---|---|---|---|
| MB Group 4<br>De-blocking sub-task (1) | MB Group 5<br>De-blocking sub-task (1) | MB Group 6<br>De-blocking sub-task (1) | MB Group 7<br>De-blocking sub-task (1) |
| MB Group 8<br>De-blocking sub-task (2) | MB Group 9<br>De-blocking sub-task (2) | MB Group 10<br>De-blocking sub-task (2) | MB Group 11<br>De-blocking sub-task (2) |

FIG. 8B

MULTI-THREADED STREAMING DATA DECODING

CLAIM OF PRIORITY

This application claims the benefit of priority of U.S. Provisional Patent Application No. 60/863,767, to inventors Jason N. Wang and Milan Mehta, filed Oct. 31, 2006 and entitled "MULTI-THREADED STREAMING DATA DECODING", the entire contents of which are incorporated herein by reference.

FIELD OF THE INVENTION

Embodiments of the present invention are related to streaming media and more particularly to parallel decoding of streaming data.

BACKGROUND OF THE INVENTION

Digital signal compression is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

MPEG-4 AVC (Advanced Video Coding), also known as H.264, is a video compression standard that offers significantly greater compression than its predecessors. The H.264 standard is expected to offer up to twice the compression of the earlier MPEG-2 standard. The H.264 standard is also expected to offer improvements in perceptual quality. As a result, more and more video content is being delivered in the form of AVC(H.264)-coded streams. Two rival DVD formats, the HD-DVD format and the Blu-Ray Disc format support H.264/AVC High Profile decoding as a mandatory player feature. AVC(H.264) coding is described in detail in "Draft of Version 4 of H.264/AVC (ITU-T Recommendation H.264 and ISO/IEC 14496-10 (MPEG-4 part 10) Advanced Video Coding)" by Gary Sullivan, Thomas Wiegand and Ajay Luthra, Joint Video Team (JVT) of ISO/IEC MPEG & ITU-T VCEG (ISO/IEC JTC1/SC29/WG11 and ITU-T SG16 Q.6), 14th Meeting: Hong Kong, CH 18-21 January, 2005, the entire contents of which are incorporated herein by reference for all purposes.

Video signal coding and decoding tend to be computationally intensive applications requiring a high memory bandwidth. Multi-processor systems have been developed with high computing performance and relatively lower power consumption. Some multi-processor systems have dedicated local memory associated with each processor core. It is appealing to implement video encoding and decoding on a multi-processor platform since the memory bandwidth in such systems may scale with the number of processors. However, due to the complexity of the decoding process it is difficult to optimize parallel video decoding for multi-processor platforms having more than two processor cores.

It is within this context that embodiments of the present invention arise.

BRIEF DESCRIPTION OF THE DRAWINGS

The teachings of the present invention can be readily understood by considering the following detailed description in conjunction with the accompanying drawings, in which:

FIG. 8A is a schematic diagram of a portion of a streaming data picture illustrating adjacent macroblocks that may be processed in parallel according to an embodiment of the present invention.

FIG. 8B is a schematic diagram of a streaming data picture illustrating the division of the picture into macroblock groups for processing in parallel as sub-tasks according to an embodiment of the present invention.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
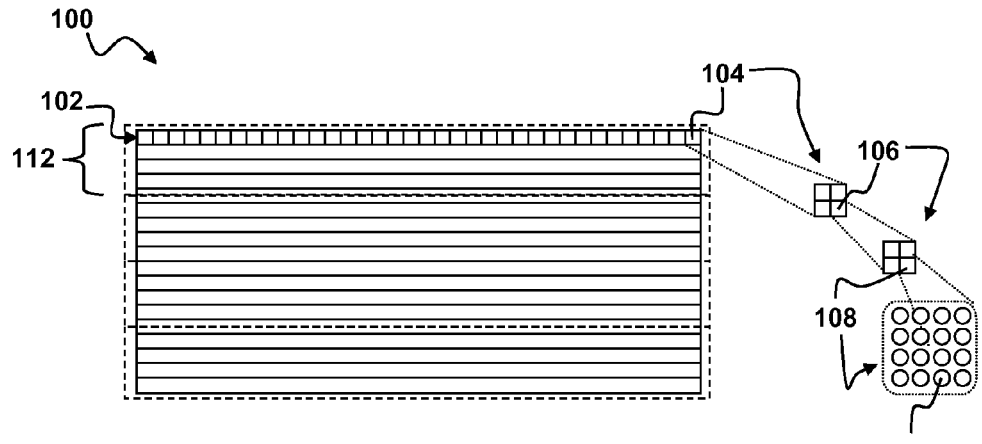
FIG. 1 is a schematic diagram illustrating one possible division of a streaming data picture for multithreaded decoding according to an embodiment of the present invention.

In embodiments of the present invention, streaming data may be broken down in suitable sized units for coding and decoding. For example, in the case of streaming video data, the streaming data may be broken down into pictures with each picture representing a particular image in a series of images. As shown in FIG. 1, a single picture 100 may be broken down into a number of slices 102. Each slice 102 contains one or more macroblocks 104. The number of macroblocks in a row depends on the size of the macroblocks and the size and resolution of the picture 100. For example, if each macroblock contains sixteen by sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each macroblock 104 may be broken down into four sub-macroblocks 106. Each sub-macroblock may be broken down into four blocks 108 and each block may contain a four by four arrangement of sixteen pixels 110.

Conventionally, streaming video images have been decoded using a single thread for the decoding of each picture or the decoding of each slice. In a conventional single-thread decoder all decoding tasks for one macroblock are completed before decoding the next macroblock. Multithreaded picture decoding—i.e., decoding multiple pictures in parallel, may also be done. In such multithreaded picture decoding, each picture or slice gets its own thread. It is relatively straightforward to duplicate a single thread decoder to implement multithreading. However, to simultaneously decode two or more pictures there must be sufficient memory to hold all of the pictures being decoded. Consequently, this simple type of multithreading is limited by the amount of available memory.

To facilitate multi-threaded decoding within pictures, each picture 100 may be broken down into two or more sections 112. Each section 112 may encompass one or more slices. In embodiments of the present invention it is possible for a slice 102 to "straddle" the boundary between to adjacent sections 112. Thus, a slice may be shared between two sections.

It is noted that each picture may be either a frame or a field. A frame refers to a complete image. A field is a portion of an image used for to facilitate displaying the image on certain types of display devices. Generally, the pixels in an image are arranged in rows. To facilitate display an image may sometimes be split by putting alternate rows of pixels into two different fields. The rows of pixels in the two fields can then be interlaced to form the complete image. For some display devices, such as cathode ray tube (CRT) displays, the two fields may simply be displayed one after the other in rapid succession. The afterglow of the phosphors used in the CRT screen combined with the persistence of vision results in the two fields being perceived as a continuous image. For other display devices, such as liquid crystal displays, it may be necessary to interlace the two fields into a single picture before being displayed. Streaming data representing encoded images typically includes information indicating whether the image is a field or a frame. Such information may be included in a header to the image.

To facilitate parallelization of decoding, a first thread may perform a decoding task on a section of streaming data, e.g., a picture, slice, macroblock etc., and the results may be buffered for access by a second thread. The first thread may store the results at a first rate, e.g., once for every macroblock processed by the first thread, while the second thread accesses the buffered data at a different rate, e.g., once for each slice or picture to be processed by the second thread. The advantage to such buffering is that there is usually a performance cost associated with each access of the buffered data by the second thread. This performance cost may be reduced by accessing the buffered data at a lower rate than the rate at which the buffered data is stored.

To implement a video decoder and utilize the advantages of a multi-processor platform, it is desirable to partition the decoding process into a few tasks that may be run in parallel. Data dependencies in the coded data stream may cause data dependencies between these tasks. If a task's output data is used by another task, the task producing the output is referred to as a producer and the task using the output data is referred to herein as a consumer. Because delays in cross processor data access may be very long, it is not efficient to have a high frequency of data exchange between producer tasks and consumer tasks. A common technique to reduce the data exchange frequency is through the use of buffers. If a producer outputs one result every 0.01 seconds and the consumer task reads the output once every 0.01 seconds, the data exchange frequency is 100 times per second or 100 Hz. If a producer output buffer is added that can hold 100 results, the consumer can access all 100 results in the buffer once per second. If memory is not an issue, it is in theory possible to infinitely reduce the data exchange frequency by adding more buffers.

Unfortunately, in real applications, such as streaming data decoding, the producer may sometimes need to access the consumer's output result. For example, a video decoder may use a pixel prediction module to generate decoded pixels. The decoded pixels may be passed to a de-blocking module for quality enhancement. Then, the de-blocked pixels may be used by the pixel prediction module to decode the next picture. In this case, the lowest data exchange frequency is once per picture no matter how many buffers are added between the pixel prediction module and the de-blocking module. As described above, this lowest data exchange frequency value is called the data dependency frequency between two modules or two tasks. In the preceding example, it may be said that the data dependency frequency between the pixel prediction module and the de-blocking module is the same as the picture frequency.

In the decoder structure design, there are a lot of constraints introduced by high frequency data dependencies in coded data streams. The key to implementing a multi-processor video decoder is to find a task partition that satisfies data dependency constraints and balances the load between the processors. In some multi-processor platforms having local memory, a processor can directly access the local memory for both instructions and data. For example, in a Cell Broadband Engine Architecture (CBEA), each synergistic processor unit (SPU) has an associated local memory with a capacity of 256K bytes. For each SPU task, it is desirable for both the instructions and data to fit in the space available in the local memory. It is useful to consider such memory size constraints along with data dependency frequency constraints in designing decoder tasks.

DETAILS

According to embodiments of the present invention a process for decoding streaming data may be divided into two or more tasks based on data dependencies between the two or more tasks. The two or more tasks may be executed in parallel on three or more processors in a way that balances a processing load of executing the two or more tasks among the three or more processors. In embodiments of the present invention, data dependencies may be categorized based on their frequencies.

By way of example and without loss of generality, in the particular case of decoding video data encoded, e.g., according to AVC (H.264), there may be pixel frequency dependencies, block frequency dependencies, sub-macroblock frequency dependencies, macroblock frequency dependencies and picture level frequency dependencies. In AVC (H.264) there are generally no slice-level frequency dependencies since the slice is issued to break the data dependencies between macroblocks. However, slice-level frequency dependencies may be present in other types of coded stream data. As such, embodiments of the invention may make use of slice-level frequency dependencies. In general, the pixel frequency is higher than the block frequency; the block frequency is higher than the sub-macroblock frequency; the sub-marcoblock frequency is higher than the macroblock frequency, the macroblock frequency is higher than the slice frequency and the slice frequency is higher than the picture frequency.

The data dependency frequency for processing a given amount of streaming data may be determined from a rate at which the streaming data is to be presented. For example, in the case of video data, video pictures are presented at some frame rate that depends on the application. For example, in a BD-ROM player, pictures are presented at a rate from 24 to 60 frames per second. In order to present video images at the desired frame rate, pictures must be processed no slower than the display frame rate. The data frequency for any section of a picture may be determined, e.g., by multiplying the number of sections per frame by the frame rate in frames per second. For example, assume the frame rate is 60 Hz, if there are 8160 macroblocks per frame, the macroblock dependency frequency is (8160 macroblocks/frame)×(60 frames/sec)=489,600 macroblocks/sec. This is the minimum number of macroblocks that must be processed each second in order to process 60 pictures per second. The section dependency frequency may be lower, e.g., if one buffered section of data has more than 1 macroblock. If there are four slices per picture the corresponding slice frequency dependency would be determined by (4 slices/picture)×(60 pictures/second)=240 slices per second. The corresponding bit rate (in Hz) for transferring this many macroblocks per second may be calculated from the number of pixels per macroblock and the number of bits per pixel. For example each macroblock may contain 256 pixels. Each pixel may require between 1 bit and three to four 8-bit bytes of data. Thus, at a data transfer rate of one byte per clock cycle and a macroblock data dependency frequency of 489,600 macroblocks/second, the pixel data dependency frequency would require a processor clock rate of between about 125 MHz and about 500 MHz. Preferably, the processor hardware should allow for an access rate that is at least this large.

In addition to hardware limitations on data transfer rates, there may be hardware or software dependent latencies associated with the data transfer. Depending on the type of hardware, there may be latency of a few cycles to a few hundred cycles associated with the act of accessing a particular memory. For example, in the case of a cell processor having multiple synergistic processor units (SPU) with associated local store, the latency for one SPU to access another SPU's local store may be as large as 200 cycles. In general, it is desirable to choose the section size such that:

$$\frac{CR}{L} > DDF,$$

where CR is the hardware clock rate, L is the data transfer latency and DDF is the data dependency frequency for the section.

For example, for a processor system with a 3.2 GHz clock rate and a data transfer having a latency of 200 cycles, the data dependency frequency would have to be less than about 16 MHz.

Data transfer rates may be limited by factors other than data transfer latency depending on the type of hardware being used. For example, certain hardware cannot do data processing and data transfer at the same time. In this case, the total delay is the sum of data_transfer_cycles and data_processing_cycles. Other types of hardware can do data processing and data transfer in parallel. In this case, the total delay is maximum of data_transfer_cycles and data_processing_cycles.

Generally, there will be a practical upper limit and lower limit on the data dependency for which parallel processing on a multi-processor makes sense. For example, if the smallest sized data dependencies in video decoding are at the picture level, there may be little advantage, if any, to parallel processing on certain multiple processor systems. In theory, it is possible for the decoding process to be divided into tasks having data dependencies down to the level of individual pixels. In practice, however, limitations on processing speed and data access latencies for the processor units in the multi-processor system being used may place a lower limit on the data dependency. For example, to efficiently divide the decoding process into different tasks for processing on certain multi-processor systems such as the CBEA-based systems it may be impractical to have data dependencies at the pixel level or block level.

Figure 2:
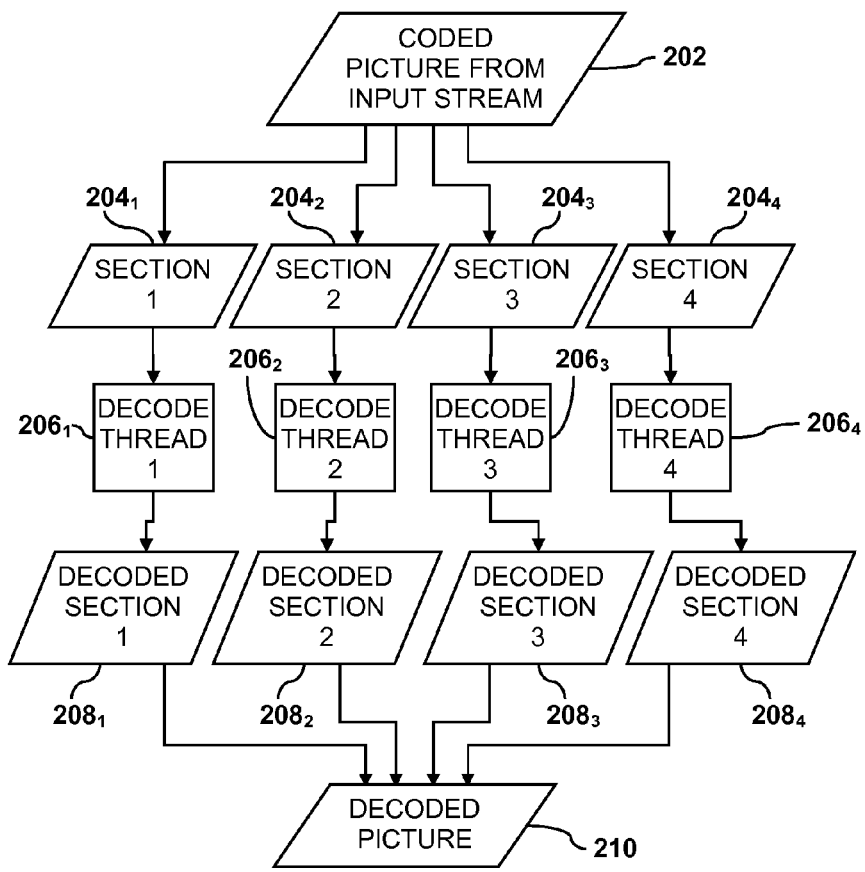
FIG. 2 is a flow diagram illustrating intra-picture multi-threaded decoding according to an embodiment of the present invention.

In some embodiments of the present invention each section 112 may be decoded in separate threads, which may be processed in parallel. For example, as shown in FIG. 2 a streaming video picture 202 may be broken down into four sections $204_1$, $204_2$, $204_3$ and $204_4$. The sections $204_1$, $204_2$, $204_3$ and $204_4$ are respectively decoded in separate threads $206_1$, $206_2$, $206_3$ and $206_4$ to produce decoded sections $208_1$, $208_2$, $208_3$ and $208_4$. The decoded sections may then be combined to display a decoded picture 210.

It is important to choose the right size for the sections $204_1$, $204_2$, $204_3$ and $204_4$. in order to obtain the best performance. In some cases, the right size for a section may be one picture. In other cases, the right section size may be smaller than one picture. If the sections are too big, e.g., there are not enough of sections in the picture to which they belong, it may be difficult to take advantage of parallelism in the decoding process. For example, some parallel processing engines include co-processors with a readily accessible built-in dedicated local memory. Adding such dedicated local memory is a relatively low cost way of making a processing system's total data bandwidth scalable to the number of processors. If the sections are too big, a single section may not fit into the local memory and may have to be buffered in a larger main memory. However, access to the main memory may be slower than access to the local memory. It is often desirable therefore that the sections be small enough to fit the available local memory. If the sections are too small they must be accessed more frequently. There is typically a latency or delay of a finite number of clock cycles associated with each memory access. Typically, the delay for a processor to access another processor's local memory is much longer than for accessing a processors own local memory. Each memory access represents a so-called "sync point". If there are too many sync points the performance of the multithreaded decoding process may suffer due to the accumulation of latencies. The right size for the sections $204_1$, $204_2$, $204_3$ and $204_4$ may depend on a number of factors such as the picture format and the type of processor.

In some embodiments of the present invention, the number of macroblocks per section may be determined based on the performance of the processor implementing the decoding. If particular macroblocks require fewer cycles to decode more of such macroblocks may be included in a section. Macroblocks corresponding to a blank screen are an example of macroblocks requiring relatively few cycles to decode. By contrast fewer macroblocks may be passed to a section if those macroblocks require a relatively large number of cycles to decode. Control over the number of macroblocks to put in the sections $204_1$, $204_2$, $204_3$ and $204_4$ may be based on a profile of the streaming data 201. Such a profile may be encoded in the streaming data itself. Alternatively, the profile may be generated at a previous level of decoding such as network adaptive layer decoding. Such decoding may provide information on the number of bits in each picture. From number of bits per picture an estimate may be made of the number of cycles required to decode a block, macroblock, slice or picture. The number of cycles may then be used to determine the number of macroblocks to put into each of the sections $204_2$, $204_2$, $204_3$ and $204_4$.

Figure 3:
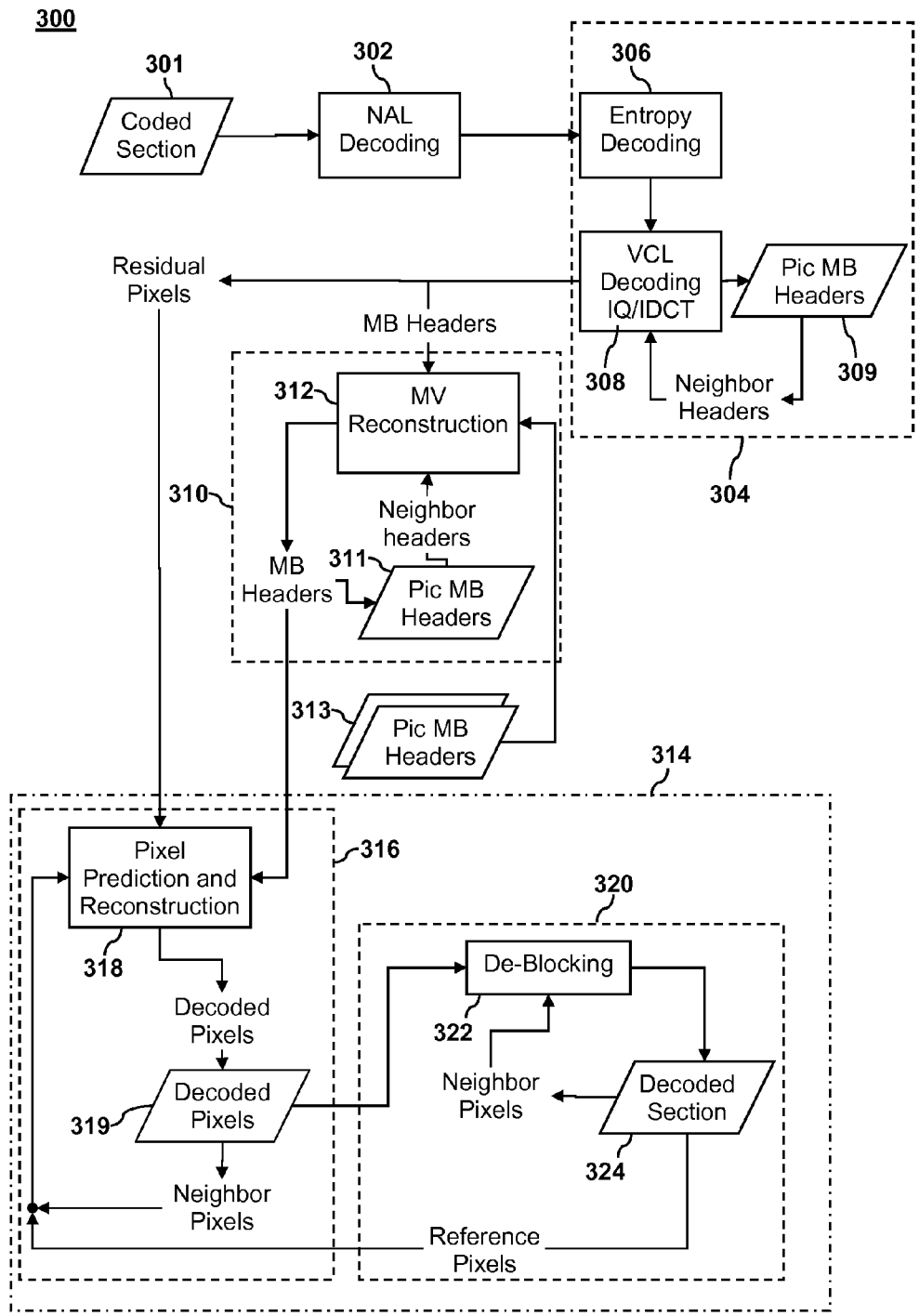
FIG. 3 is a flow diagram illustrating the general process flow in streaming data decoding.

FIG. 3 illustrates an example of a possible process flow in a method 300 for decoding of streaming data 301 with data dependency frequencies for different tasks within the process flow. This particular example shows the process flow for video decoding, e.g., using the AVC (H.264) standard. The coded streaming data 301 may initially be stored in a buffer. Where coded streaming data 301 (e.g., a video data bitstream) has been transferred over a network, e.g., the Internet, the data 301 may initially undergo a process referred to as network abstraction layer (NAL) decoding, indicated at 302. NAL decoding may remove from the data 301 information added to assist in transmitting the data. Such information, referred to as a "network wrapper" may identify the data 301 as video data or indicate a beginning or end of a bitstream, bits for alignment of data, and/or metadata about the video data itself. In addition, by way of example, the network wrapper may include information about the data 301 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section.

Due to its complexity, NAL decoding is typically done on a picture and slice level. The smallest NAL buffer used for NAL decoding is usually slice sized. Fortunately, the NAL decoding process 302 involves a relatively low number of cycles. Consequently, the NAL decoding process 302 may be done on a single processor.

After NAL decoding at 302, the remaining decoding illustrated in FIG. 3 may be implemented in three different thread groups or task groups referred to herein as video coded layer (VCL) decoding 304, motion vector (MV) reconstruction 310 and picture reconstruction 314. The picture reconstruction task group 314 may include pixel prediction and reconstruction 316 and de-blocking 320. In embodiments of the present invention, these tasks groups may be chosen based on data dependencies such that each task group may complete its processing of all the macroblocks in a picture (e.g., frame or field) or section before the macroblocks are sent to the next task group for subsequent processing.

Certain codecs may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 308 are typically at the macroblock level for macroblocks within the same slice. Consequently results produced by the VCL decoding process 304 may be buffered at the macroblock level.

VCL decoding 304 often includes a process referred to as Entropy Decoding 306, which is used to decode the VCL syntax. Many codecs, such as AVC(H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC(H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC(H.264) bitstreams. Decoding the entropy layer of AVC(H.264)-coded data streams can be computationally intensive and may present challenges for devices that decode AVC(H.264)-coded bitstreams using general purpose microprocessors. To decode high bit-rate streams targeted by the Blu-ray or the HD-DVD standards, the hardware needs to be very fast and complex, and the overall system cost could be really high. One common solution to this problem is to design special hardware for CABAC decoding. Alternatively, entropy decoding may be implemented in software. An example of a software implementation of entropy decoding may be found in co-pending U.S. Provisional Patent Application No. 60/823,620, to Xun Xu, filed Aug. 25, 2006 and entitled "ENTROPY DECODING METHODS AND APPARATUS", which is incorporated herein by reference.

In addition to Entropy Decoding 306, the VCL decoding process 304 may involve inverse quantization (IQ) and/or inverse discrete cosine transformation (IDCT) as indicated at 308. These processes may decode the headers 309 and data from macroblocks. The decoded headers 309 may be used to assist in VCL decoding of neighboring macroblocks.

VCL decoding 304 may be implemented at a macroblock level data dependency frequency. Specifically, different macroblocks within the same slice may undergo VCL decoding in parallel and the results may be sent to the motion vector reconstruction task group 310 for further processing.

Subsequently, all macroblocks in the picture or section may undergo motion vector reconstruction 310. The MV reconstruction process 310 may involve motion vector reconstruction 312 using headers from a given macroblock 311 and/or co-located macroblock headers 313. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 316 using a process based on residual pixels from the VCL decoding process 304 and motion vectors from the MV reconstruction process 310. The data dependency frequency (and level of parallelism) for the MV depends on whether the MV reconstruction process 310 involves co-located macroblocks from other pictures. For MV reconstruction not involving co-located MB headers from other pictures the MV reconstruction process 310 may be implemented in parallel at the slice level or picture level. For MV reconstruction involving co-located MB headers the data dependency frequency is at the picture level and the MV reconstruction process 310 may be implemented with parallelism at the slice level.

The results of motion vector reconstruction 310 are sent to the picture reconstruction task group 314, which may be parallelized on a picture frequency level. Within the picture reconstruction task group 314 all macroblocks in the picture or section may undergo pixel prediction and reconstruction 316 in conjunction with de-blocking 320. The pixel prediction and reconstruction task 316 and the de-blocking task 320 may be parallellized to enhance the efficiency of decoding. These tasks may be parallelized within the picture reconstruction task group 314 at a macroblock level based on data dependencies. For example, pixel prediction and reconstruction 316 may be performed on one macroblock and followed by de-blocking 320. Reference pixels from the decoded picture obtained by de-blocking 320 may be used in pixel prediction and reconstruction 316 on subsequent macroblocks. Pixel prediction and reconstruction 318 produces decoded pixels 319 that include neighbor pixels which may be used as inputs to the pixel prediction and reconstruction process 318 for a subsequent macroblock. The data dependencies for pixel prediction and reconstruction 316 allow for a certain degree of parallel processing at the macroblock level for macroblocks in the same slice.

The de-blocking task group 320 includes a de-blocking stage 322 that produces a decoded picture 324. The decoded picture 324 may provide neighboring pixels for use in de-blocking a neighboring macroblock. In addition, decoded pictures 324 may provide reference pixels for pixel prediction and reconstruction 318 for subsequent macroblocks. De-blocking 320 may be parallelized on a macroblock level for macroblocks in the same picture.

For most multi-processor hardware platforms, the inter processor data access delay is shorter than the time interval between video pictures. However, only a few parallel processing engines can do inter-processor data transfer faster than the macroblock processing speed. It is acceptable to have two tasks exchange data at the picture frequency. Based on the picture frequency dependencies described above with respect to FIG. 3, it is possible to break up the decoding process 300 into five separate tasks. These tasks are A) NAL decoding 302 and decoder internal management, B) VCL syntax decoding and IQ/IDCT 304, C) motion vector reconstruction 310 and D) pixel prediction and reconstruction 316 and E) de-blocking 320.

In general, NAL decoding may be done at a picture or slice level data dependency frequency. For codecs such as AVC (H.264) the data dependencies involved in NAL decoding 302 may be fairly complex yet the overall NAL decoding process 302 may take a relatively low number of cycles. Consequently it may be more efficient to implement all NAL decoding 302 on a single processor rather than to attempt to parallelize this process. The motion vector reconstruction task 310 typically takes about one tenth as many processor cycles as for VCL syntax decoding and IQ/IDCT 304, pixel prediction and reconstruction 316 and de-blocking 320. The computational complexities of the latter three tasks are fairly similar. However, the execution cycle allocation among these three large cycle tasks is different for different coded video streams.

Within the VCL syntax decoding and IQ/IDCT 304 there are only macroblock level data dependencies within each slice. For this task, the slices may be treated as being independent of each other. The motion vector reconstruction task 310 depends on the output of the VCL syntax decoding and IQ/IDCT 304 for input. The pixel prediction and reconstruction task 316 takes the outputs of the VCL syntax decoding and IQ/IDCT task 304 and motion vector reconstruction task 310 as inputs. Within the motion vector reconstruction task 310 and pixel prediction and reconstruction task 318 there are macroblock level data dependencies, but slices within one picture are independent of each other.

The pixel prediction and reconstruction task 316 may involve motion compensation. The picture dependency in the pixel prediction and reconstruction task 316 may result from such motion compensation. Motion compensation is a process that uses a previously decoded picture to predict the current picture. In the motion compensation process, a two-dimensional vector, called a motion vector, is used to reference the pixels in a previously decoded picture. The picture level dependency in the motion vector reconstruction task 310 is casued by direct prediction. In direct prediction, a previously decoded macroblock motion vector is used to calculate the current macroblock's motion vector. The referenced macroblock is in a previously decoded picture at the same position of the current macroblock. In an AVC decoder, the previously decoded reference picture is the output of the de-blocking task 320. Because of limitations on motion vector ranges defined by the coding standard, not all the pixels in the previous picture may be available to predict a certain macroblock in the current picture. For example, the motion vector range for an AVC level 4.1 stream is −512 to 511.75 pixels vertically and −1024 to 1023.75 pixels horizontally. If the picture size is 1920×1088 pixels, about one quarter of the pixels in the reference picture can be used for prediction of a corner macroblock. By contrast, almost all of the pixels in the reference picture can be used for prediction of a center macroblock.

Note that in the example depicted in FIG. 3, there is no dependency loop between the VCL decoding and IQ/IDCT task 308 and any other tasks. As such, this task may be merged into any or all of the VCL decoding task 304, motion vector reconstruction task 310 or pixel prediction and reconstruction task 316 to balance the task loads amongst available processors. Because some blocks may not have DCT coefficients, merging the IQ/IDCT task 308 into the block syntax decoding loop can allow the decoder to do IQ/IDCT only for coded blocks and reduce the number of branches.

The decoding method described above with respect to FIG. 3 may be implemented with a processing module capable of implementing parallel processing. In particular, different sections of a picture may be processed in parallel. As used herein, processing in parallel means that, to some extent, the processing of two or more different tasks overlaps in time. Table I below gives an example of how the different task groups of FIG. 3 may be processed in parallel on four different sections of a picture over the course of six intervals of time. Each section may be processed with a different processor.

TABLE I

| Int | SECTION 1 | SECTION 2 | SECTION 3 | SECTION 4 |
|---|---|---|---|---|
| 1 | VCL DECODING | | | |
| 2 | MV RECONSTRUCTION | VCL DECODING | | |
| 3 | PICTURE RECONSTRUCTION | MV RECONSTRUCTION | VCL DECODING | |
| 4 | | PICTURE RECONSTRUCTION | MV RECONSTRUCTION | VCL DECODING |
| 5 | | | PICTURE RECONSTRUCTION | MV RECONSTRUCTION |
| 6 | | | | PICTURE RECONSTRUCTION |

It is noted that other parts of the decoding process, such as NAL decoding 302 may be implemented in parallel with VCL decoding 304, Motion Vector reconstruction 310 and Picture Reconstruction 314 using the type of "staggered" processing illustrated in Table II. Such parallel processing may be implemented with a processing module capable of implementing parallel processing.

Figure 4:
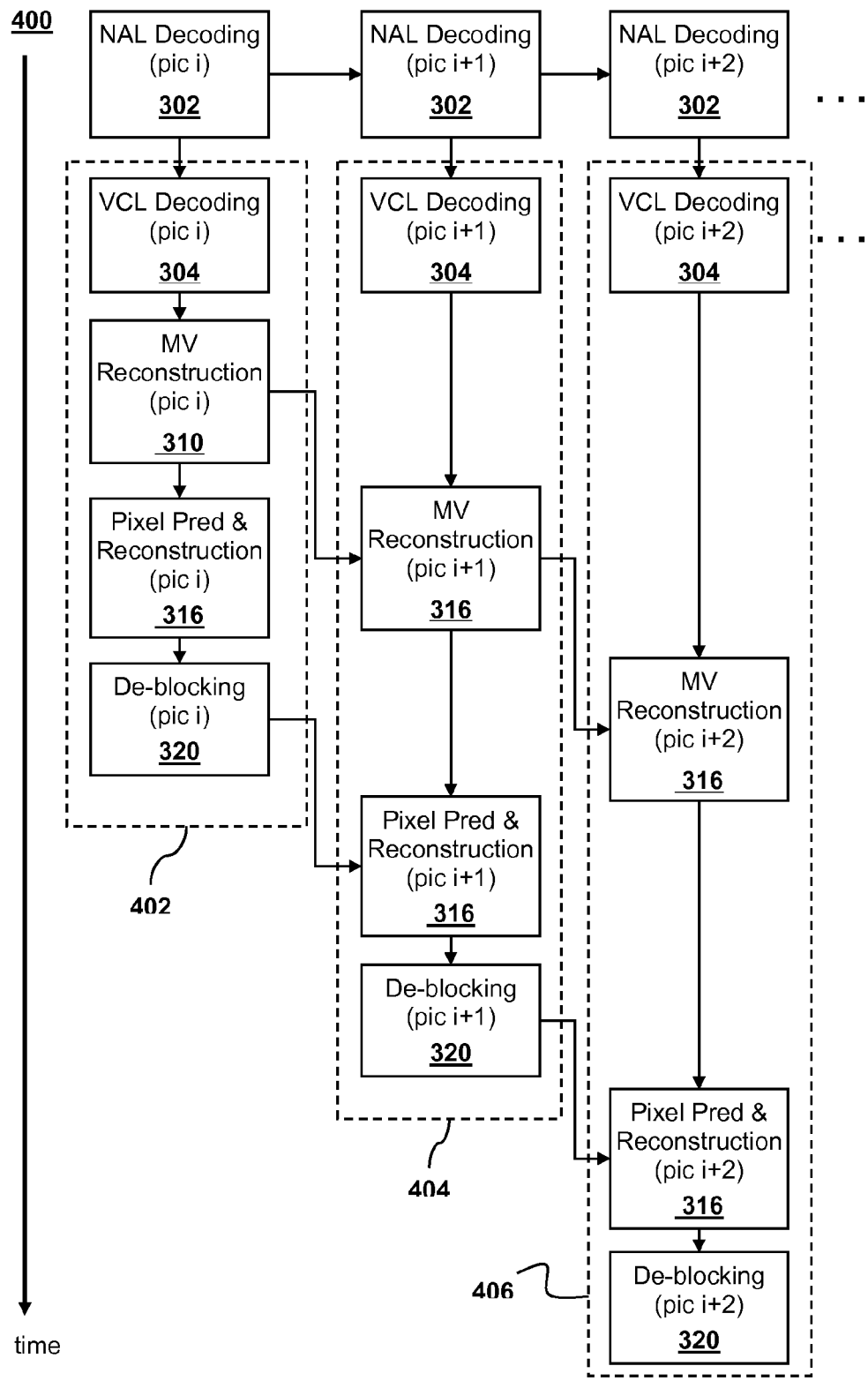
FIG. 4 is a flow diagram illustrating an example of a picture dependency based multi-threaded decoder according to an embodiment of the present invention.

FIG. 4 depicts a flow diagram illustrating a possible execution timing for implementing a multi-threaded streaming data decoder 400 on three or more processors 402, 404, 406 based on the data dependencies between the above-described decoding tasks. In the decoder 400 of FIG. 4, consumer tasks start after producer tasks have been completed for one picture. As a result, a consumer task only synchronizes (syncs) only once per picture with the producer task or tasks upon which the consumer task depends for input data. For example, motion vector reconstruction for picture (i+1) doesn't begin until VCL decoding has completed for picture (i+1) and motion vector reconstruction has completed for picture (i). Similarly, pixel prediction and reconstruction for picture (i+1) doesn't begin until motion vector reconstruction has been completed for picture (i+1). De-blocking for picture (i+1) doesn't begin until pixel prediction and reconstruction has been completed for picture (i+1) and de-blocking has been completed for picture (i).

It is noted that such multi-threaded decoding may be implemented on streaming data other than video data. Furthermore, although implementation on three processors is shown in FIG. 4, those of skill in the art will recognize that such multi-threaded decoded may be implemented on more than three processors.

In FIG. 4, if the execution cycles of NAL level decoding may be ignored and the execution cycles of the VCL decoding task 304, pixel prediction and reconstruction task 316 and de-blocking task 320 are the same, this multi-threaded decoder can have about 1.5 active tasks running in parallel. If there are other tasks, such as audio decoding, display and system control, this AVC decoder may yield acceptable performance for a dual-processor machine. If the hardware has more than two processing units, the performance of the decoder shown in FIG. 2 may be less than optimal. Alternatively, the decoder may be inefficient if the decoding process of a particular stream cannot balance the computational load among the VCL decoding task 304, pixel prediction and reconstruction task 316 and de-blocking task 320.

There are a number of approaches to further parallelize a multi-threaded decoder task structure of the type shown in FIG. 4. Examples of these approaches include, but are not limited to A) overlapping one or more of the tasks shown in FIG. 4; B) further partitioning one or more of the tasks into multiple sub-tasks; C) utilizing slices within one picture; and combinations of two or more of A), B) and C).

The use of slices within pictures is particularly advantageous if there is more than one slice per picture. Typically, there are no data dependencies between slices. If so, and there is more than one slice per picture, tasks such as VCL decoding 304, MV reconstruction 310 and pixel prediction 316 may be implemented in parallel by assigning processing of the same task for each different slice from the same picture to a different processor. However, the de-blocking task 320 may have data dependencies cross slice boundary.

Figure 5:
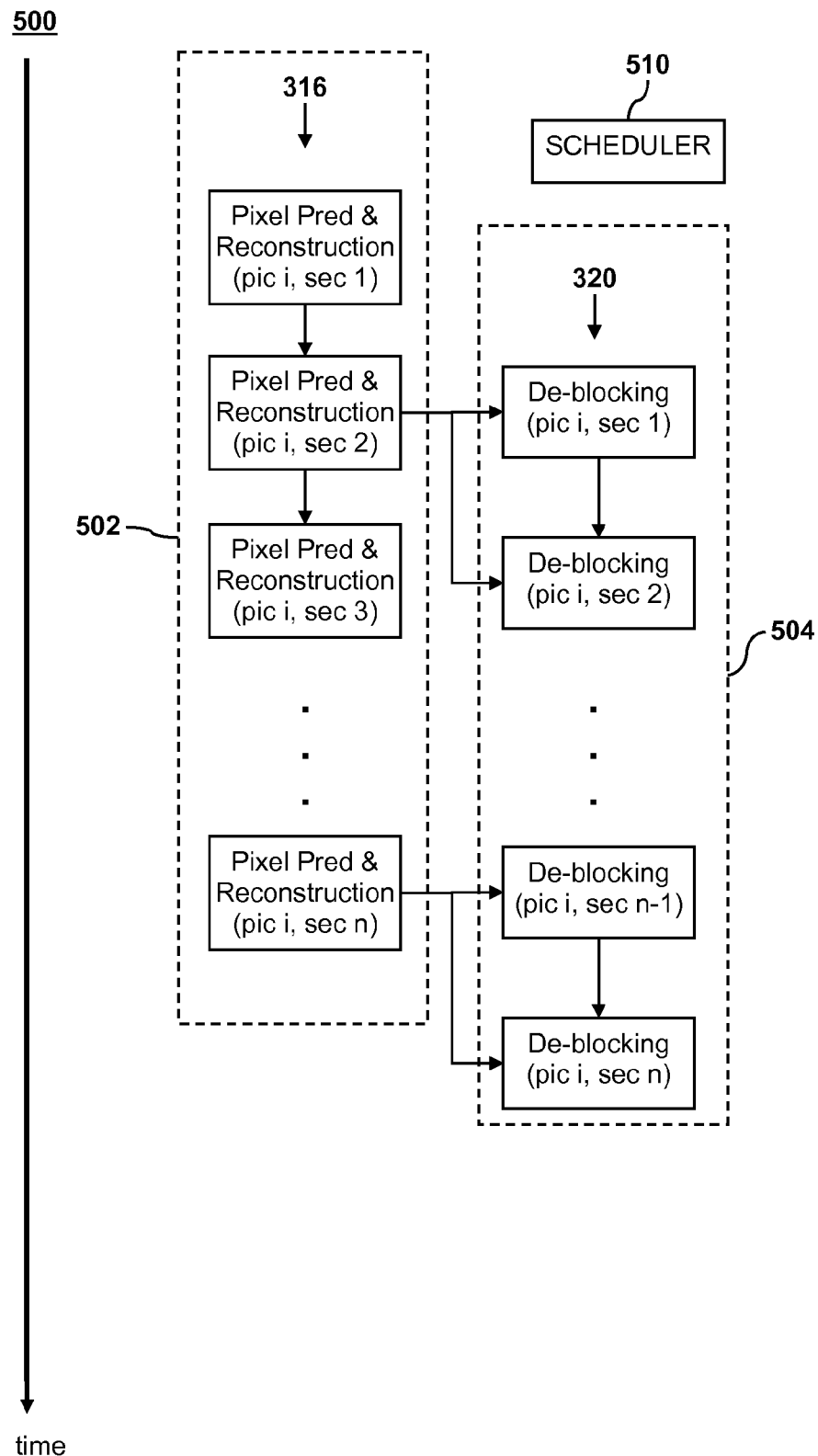
FIG. 5 is a flow diagram illustrating an example of overlapping two tasks in the same picture by using picture sections in a multi-threaded decoder according to an embodiment of the present invention.

Overlapping of tasks may be understood by referring to FIG. 5, which shows a portion of a decoder 500 similar to that shown in FIG. 4 that has been modified to overlap certain tasks executing in parallel on different processors. As discussed above, there is a delay and corresponding cost in performance associated with each sync. The sync delay is dependent on the particular hardware platform implementing the decoder 500. If the hardware sync delay is relatively low, it is possible to sync the consumer task and the producer task multiple times per picture even if the data dependency between the two tasks is at the picture frequency. In this way certain tasks such as those shown in FIG. 4 may overlap and the decoder may be made adaptive to the hardware performance. For example, as shown in FIG. 5, it may be desirable to overlap execution of the pixel prediction and reconstruction task 316 on one processor 502 with the execution of the de-blocking task 320 on another processor 504. In such a case a picture may be partitioned into multiple sections, e.g., n sections, where n is greater than 1. The pixel prediction and reconstruction task 316 may then sync with the de-blocking task 320 once per section. As a result the de-blocking task 320 may start after pixel prediction and reconstruction 316 has been completed for the first section (section 1) for picture (i). Subsequently, the pixel prediction and reconstruction task 316 and de-blocking task 320 may run in parallel with the pixel prediction and reconstruction task 316 processing at least one section ahead of the de-blocking task 320.

The task overlap technique depicted in FIG. 5 may also be applied between other decoder tasks, e.g., between VCL decoding 304 and motion vector reconstruction 310 and/or between motion vector reconstruction 310 and pixel prediction and reconstruction 316. The section size for task overlap may be made adaptive to the input stream and task sync delay and overhead. As shown in FIG. 5, the decoder 500 may include a scheduler 510 that determines the section size from information about the input stream and task sync delay/overhead. The sections may be as large as a single picture or may be smaller sub-units of a picture, e.g., slices, macroblocks, sub-macroblocks, blocks, pixels or some combination of two or more such sub-units. By way of example, and without limitation, the scheduler 510 may decide at every picture how big the section has to be. The scheduler 510 may balance the advantage of starting a task early versus the cost in performance resulting from having two or more sync points for that task.

For example, to calculate the optimal section size for the best performance of the type shown in FIG. 5, it is desirable for the de-blocking task 320 start as early as possible, and, the task sync overhead cycles to be as small as possible. Assume, for the sake of example, that the pixel prediction and reconstruction task 316 performance is P cycles per macroblock, the task sync overhead is S cycles and each picture has T macroblocks. To get the minimum value of de-blocking start delay plus sync overhead cycles e.g. to get the minimum value of (section_size*P)+(T*S/section_size), the optimal section macroblock count is $$\sqrt{\frac{S \cdot T}{P}}.$$

The pixel prediction module 316 performance depends on the picture prediction mode (intra predicted or inter predicted), the number of motion vectors in each macroblock and the current picture and whether reference pictures are coded as frame or field. The task sync delay depends on the hardware platform and operating system being used. Therefore, the scheduler 510 should know (or at least estimate) the hardware sync delay, input picture size in number of macroblocks, the slice prediction type for each slice, number of skipped macroblocks, number of intra coded macroblocks and average number of motion vectors for each macroblock. Then, the scheduler can estimate the task 316 performance and calculate the optimal section size for a given picture. In some embodiments, not all of the desired information for the scheduler is available. As the result, the accuracy of estimated task 316 performance may decrease.

An additional consideration for parallelization of the pixel prediction/reconstruction and de-blocking tasks is the motion vector size. For example, a motion vector may be applied to a first section of a picture (e.g., a MB, sub-MB, block or pixel). The motion vector may point to a second section. If the MV points to a section that is already defined (i.e., previously processed), parallel pixel prediction and/or de-blocking of the two sections may be implemented. If the MV does not fall within a defined section, parallel processing may be implemented if the overlap between processing of the current and previous pictures is such that processing is completed on the second section before beginning processing on the first section.

In some embodiments of the invention, a scheduler may also overlap the decoding process for multiple pictures. Implementation of such cross-picture overlap is partly dependent on data dependencies between the consumer and producer tasks being overlapped. For example, the VCL decoding task 304 may be executed in parallel for different pictures. The motion vector reconstruction task 310 may be overlapped for different pictures so long as a co-located macroblock for one picture can be finished before it is needed for a subsequent picture. The pixel prediction and reconstruction task 316 for a current picture uses the output of the de-blocking task 320 for the previous picture. Thus, if these two tasks are to be overlapped for multiple pictures it is desirable to ensure that de-blocking of the previous picture has been done for all pixels within the motion vector range for the current picture. The motion vector range of the current picture may be derived, e.g., from the coded data stream level, or from the result of the motion vector reconstruction task 310. If the maximum motion vector size is smaller than the vertical size of a picture section, the motion compensation (part of the pixel prediction and reconstruction task 316) of the current picture may be overlapped with the previous picture de-blocking task.

By way of example, the motion vector size may be derived from the coded stream level and from the result of MV reconstruction. For instance, in AVC standard section A.3.1 table A-1, the maximum allowed motion vector size in X and Y directions is listed for each coded stream level. The decoder also can get the actual motion vector size from motion vector reconstruction module 310. Alternatively, the encoder may code the maximum motion vector size of one picture into the stream metadata. After the scheduler gets the motion vector size in X and Y directions, it can estimate the number of sections that this motion vector can cross. For example, if the motion vector is (110.25, 70.50), it can cross round_up ((110.25+2)/16)=7 macroblocks horizontally and round_up ((70.50+2)/16)=5 macroblocks vertically. If the picture size is 120×68 macroblocks and each section is 20 macroblocks, this motion vector can cross 5*round_up(120/20)+round_up(7/20)=31 sections.

It is noted that where sub-pixel interpolation is used, the motion compensation sub-pixel interpolation filter typically needs 2 more extra pixels to do 6 tap filtering.

Figure 6:
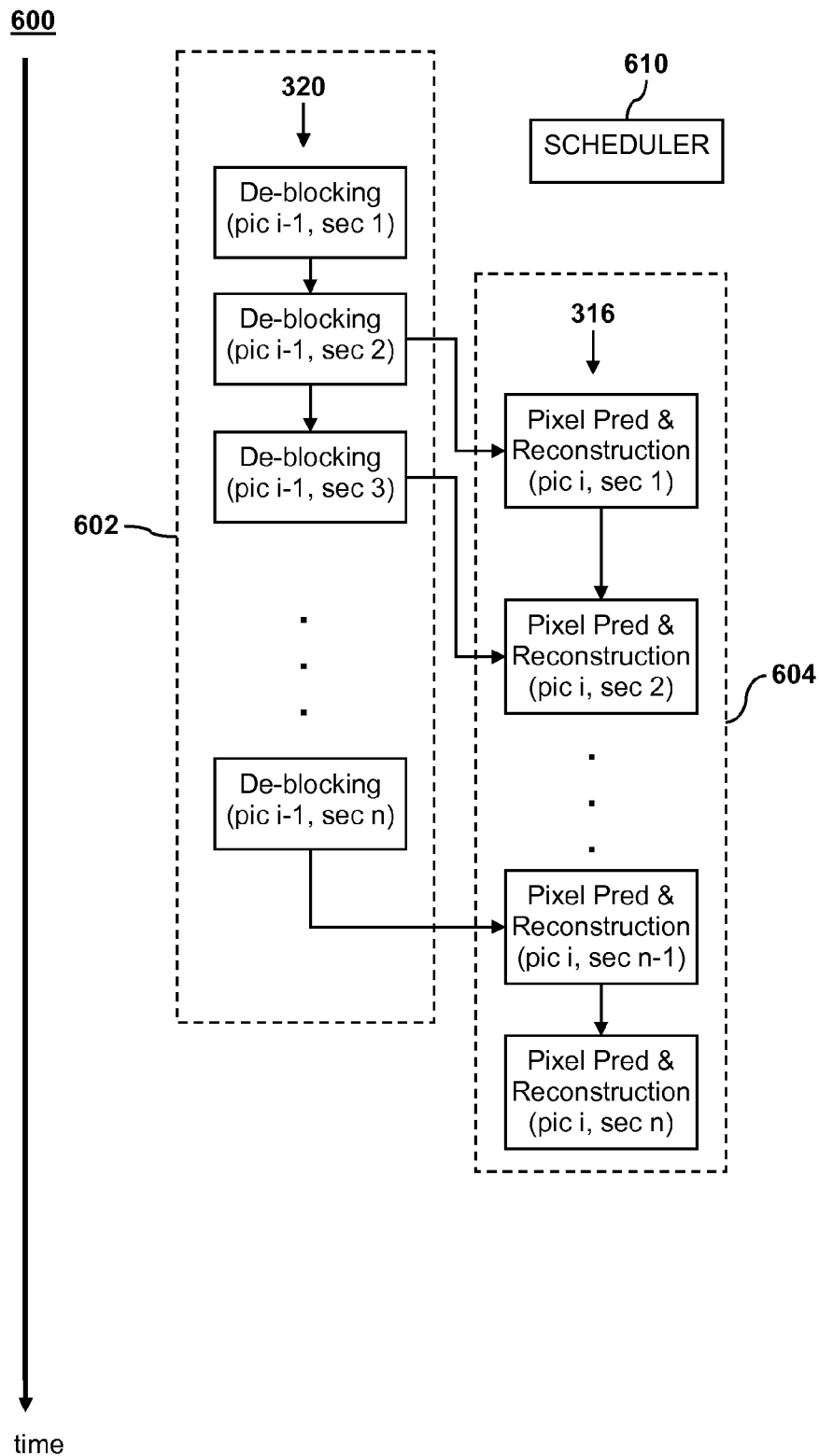
FIG. 6 is a flow diagram illustrating an example of overlapping two tasks in different pictures by using picture sections in a multi-threaded decoder according to an embodiment of the present invention.

FIG. 6 illustrates an example of a portion of a decoder 600 that has been configured to implement overlap of pixel prediction and reconstruction 316 and de-blocking 320 tasks on processors 602 and 604 respectively. As described above, the motion vector range may affect the degree of parallelism for pixel prediction/reconstructon 316 and de-blocking 320. In the example depicted in FIG. 6, the motion vector range is such that pixel prediction and reconstruction for section 1 of a current picture (i) may begin after de-blocking has been completed for the first two sections of the previous picture (i−1). This particular configuration is shown for the purpose of example, but is not a limitation on any embodiment of the invention. The decoder 600 may include a scheduler 610 that determines a size for the sections and/or derives the motion vector range as described above. For such embodiments it is noted that if there are overlaps within tasks in the same picture and the tasks cross multiple pictures, it is desirable to use the same picture section configuration sync for all these tasks. In that way, one producer sync signal may be shared by multiple consumer tasks.

Figure 7:
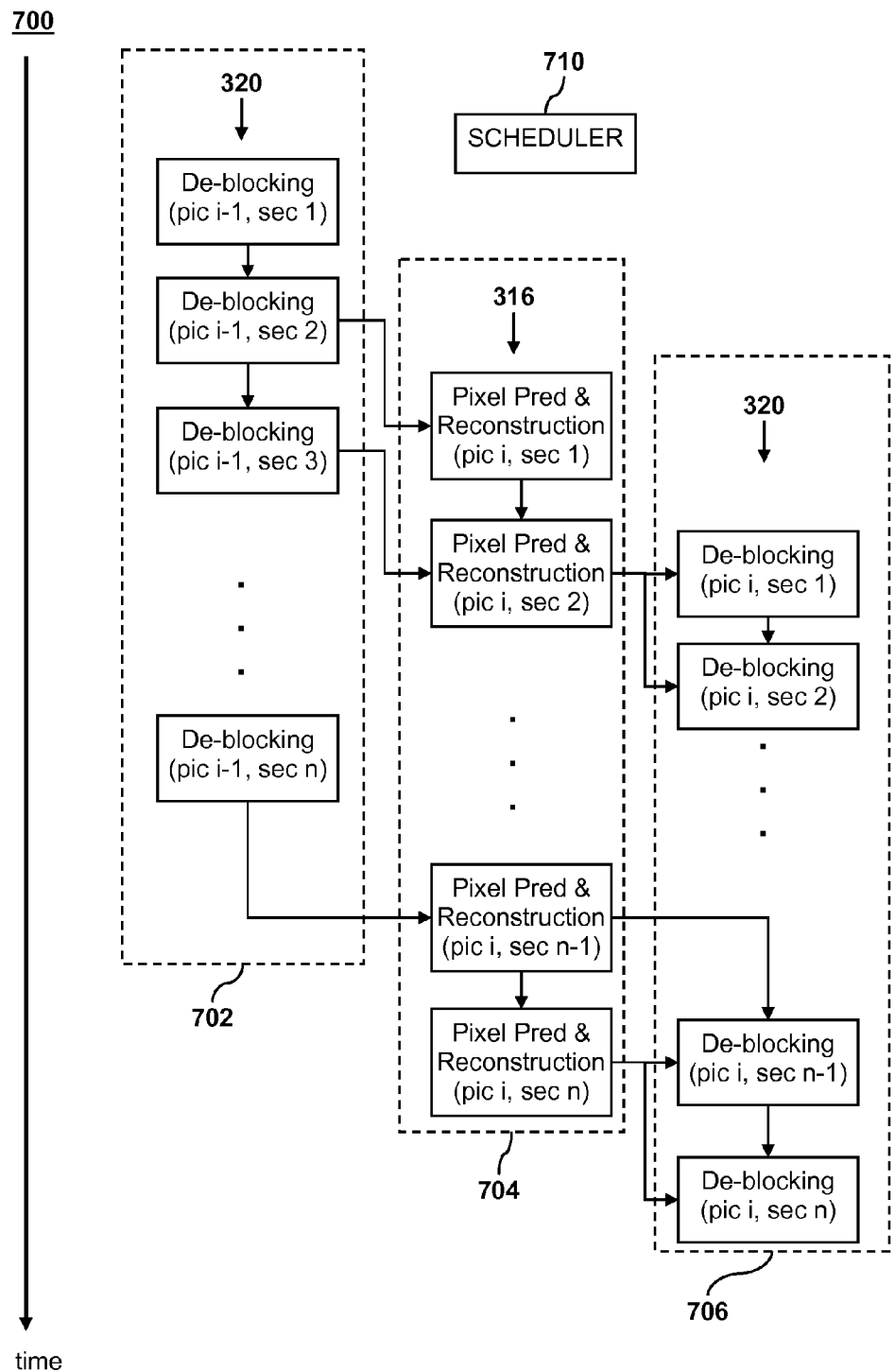
FIG. 7 is a flow diagram illustrating an example of overlapping two tasks in the same picture and in different pictures by using picture sections in a multi-threaded decoder according to an embodiment of the present invention.

In some embodiments of the present invention tasks may be parallelized both within pictures, e.g., as shown in FIG. 5 and across different pictures, e.g., as shown in FIG. 6 at the same time. FIG. 7 depicts an example of a multi-threaded decoder 700 implementing such dual parallelization for the pixel prediction/reconstruction task 316 and the de-blocking task 320. The decoder 700 may implement the pixel prediction/reconstruction task 316 and the de-blocking task 320 on three different processors 702, 704, 706. Processors 702 and 704 overlap de-blocking 320 for picture (i−1) and pixel prediction/reconstruction 316 for picture (i) on a section-by-section basis as described above with respect to FIG. 6. The decoder 700 may also overlap the pixel prediction 316 for picture (i) with the de-blocking for picture (i) on a section-by-section basis as described above with respect to FIG. 5.

The decoder 700 may include a scheduler 710 that determines a size for the sections and/or derives the motion vector range as described above.

In addition to implementing parallelism between different decoding tasks and/or decoding of different pictures, embodiments of the present invention may implement parallelism within a particular task. In some embodiments instances of a particular thread may be cloned, i.e., the same code may be implemented in parallel for different data. By way of example, certain tasks such as motion vector reconstruction 310, picture prediction/reconstruction 316 and deblocking 320 may be implemented in parallel in this manner. The group size for this type of parallel implementation may be as large or as small as the access rate, latency and available memory allow. For example, de-blocking 320 may be implemented across slice boundaries. The group size for parallel implementation of this task may be as small as block level. In addition, a task may be assigned to a section which may be processed in parallel with other sections. Each task may be further broken down into sub-tasks. Each sub-task may process different groups within the section in parallel.

By way of example and without loss of generality, decoding tasks may be broken up and different numbers of processors may be assigned to the same tasks to process different parts of same picture. For example, for many currently available multiple-processor systems, it is impractical to sync certain tasks for every macroblock. However, embodiments of the present invention may overcome such disadvantages by grouping two or more macroblocks together into a macroblock group and parallelizing a task on a macroblock group basis. Within the macroblock group the data dependencies may be present at a macroblock frequency. However, between different macroblock groups the data dependencies are at a macroblock group frequency. To optimize parallel processing of a task using such groups, the group size may be made adaptive to the task sync delay and overhead.

Figure 8C:
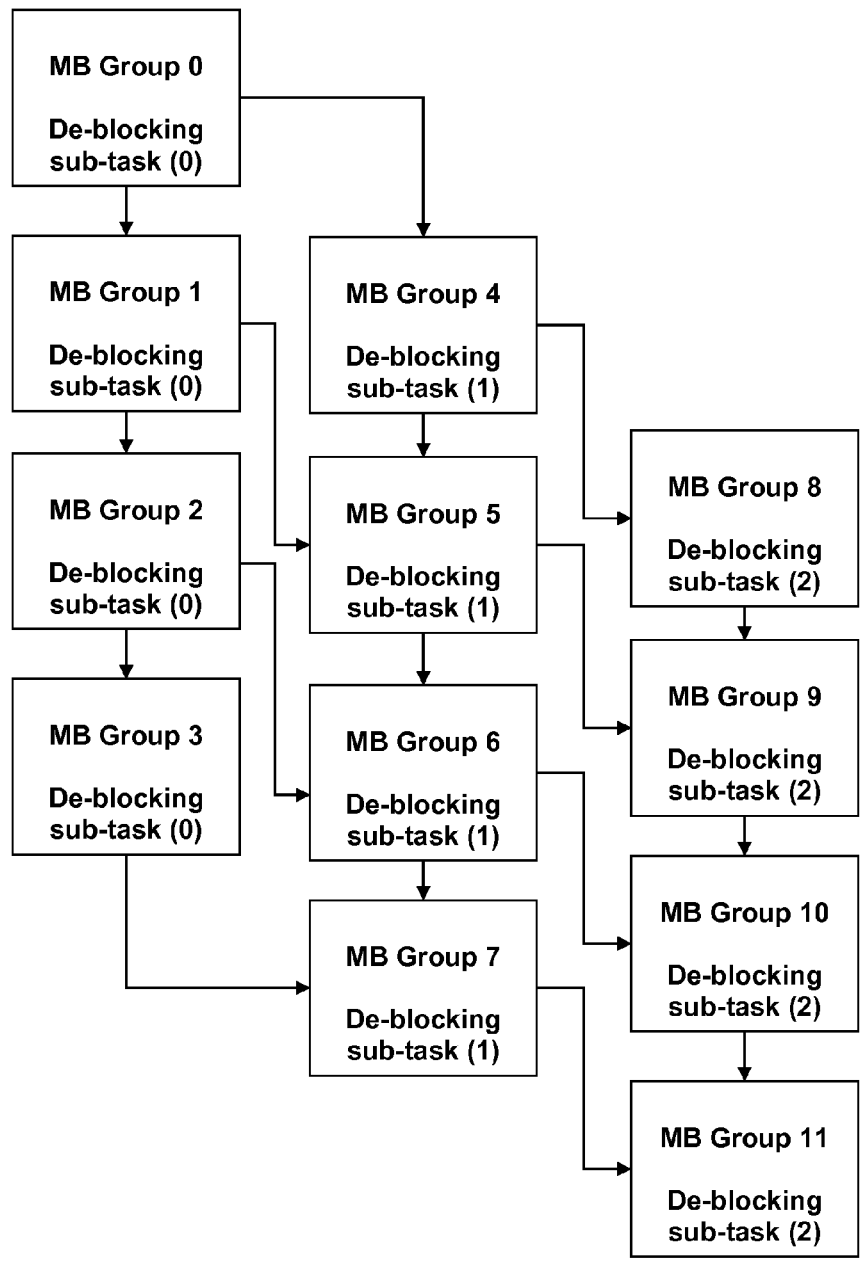
FIG. 8C is a flow diagram illustrating parallel processing of multiple sub-tasks in a multi-threaded decoder according to an embodiment of the present invention.

In embodiments of the invention, certain tasks may proceed in parallel on some sections of a picture if the results of the task for one or more other sections are available. Examples of such tasks include, but are not limited to, the motion vector reconstruction task 310, the pixel prediction/reconstruction task 316 and the de-blocking task 320. For example, in de-blocking task 320, as illustrated in FIG. 8A, such processing of a given macroblock of a picture 800 depends on the result of the de-blocking of its top and left neighbor macroblocks. If de-blocking is complete for a given macroblock 802, de-blocking may proceed in parallel for its right neighbor macroblock 804 and bottom neighbor macroblock 806. Processing of a bottom-right neighbor macroblock 808 may depend on the output of the processing of its three neighbor macroblocks 802, 804, 806. It is noted that, if processing has been completed for a group 810 containing the four neighboring macroblocks 802, 804, 806, 808 processing may commence on a right neighboring group 812 and a bottom neighboring group 814. Consequently, these two groups (indicated by shading) may be processed in parallel with each other. FIGS. 8B-8C illustrate an example of parallel execution that utilizes groups and the type of data relationship described above with respect to FIG. 8A. FIG. 8B depicts a picture 820 that has been partitioned into twelve macroblock groups. By way of example and without loss of generality, the de-blocking of each row of macroblock groups may be associated with a sub-task within the de-blocking task 320. FIG. 8C illustrates the execution flow for processing of these macroblock groups. Note that macroblock group 1 and macroblock group 4 can be processed in parallel once macroblock group 0 has been processed. Once processing is complete on groups 1 and 4 groups 2, 5 and 8 may be processed in parallel.

Once processing is complete on groups 2, 5 and 8 groups 3, 6 and 9 may be processed in parallel. Once processing is complete on groups 3, 6 and 9 groups 7 and 10 may be processed in parallel. Once groups 7 and 10 are processed, group 11 may be in parallel.

Figure 8D:
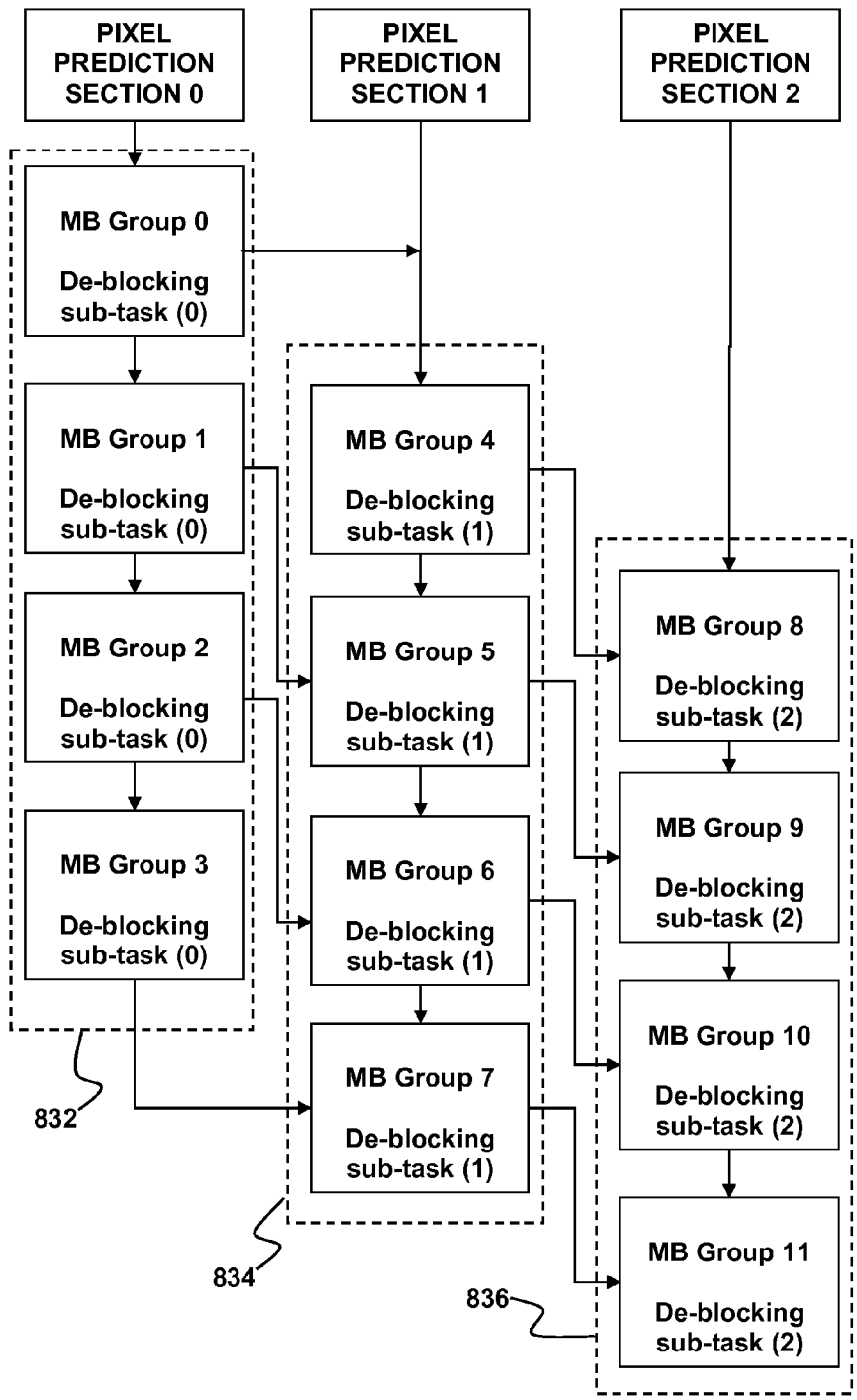
FIG. 8D is a flow diagram illustrating parallel processing of multiple sub-tasks in a multi-threaded decoder according to another embodiment of the present invention.

In some embodiments, the different sub-tasks for processing the groups may be linked to the completion of a previous task for a section. For example, the de-blocking sub-tasks may be kick-started by the finish of the pixel prediction tasks for a whole section. By way of example, a section may be defined as a row of macroblock groups of the type shown in FIG. 8B. As shown in FIG. 8D, a de-blocking sub-task 832 for section 0 beginning with group 0 may commence upon completion of pixel prediction for section 0, containing groups 0, 1, 2, and 3. De-blocking sub-task 834 for section 1 containing groups 4, 5, 6 and 7 may begin upon completion of pixel prediction for section 1 and de-blocking for group 0. De-blocking sub-task 836 for section 2 containing groups 8, 9, 10 and 11 may begin upon completion of pixel prediction for section 2 and de-blocking for group 4. Otherwise, de-blocking may proceed as described with respect to FIG. 8C. Note that there is a tradeoff between the advantage of starting processing early on sub-task 832 and the disadvantage in performance due to the presence of two or more sync points in starting the other sub-tasks. The net advantage is partly dependent on the size chosen for the sections. A decoding program may decide at each picture how large the section size has to be in order for parallelism, e.g., of the types shown in FIGS. 8A-8D, to be advantageous.

It is noted that the sub-tasks 832, 834 and 836 may be implemented on different processors. It is further noted that it is not necessary for a single processor to be dedicated to each sub-task. For example, sub-task 832 may be implemented on one processor for groups 0 and 1 but may be implemented on a different processor for groups 2 and 3. In some situations, the task scheduling program used to assign tasks among different processors may determine that it is more efficient to process groups 0, 1, 2 and 3 on the same processor with sub-task 832. Such processing may be more efficient, e.g., since the code for sub-task 832 can be re-used without having to re-load it into a local store associated with the processor. In other situations, it may be more efficient to process groups 0 and 1 with sub-task 832 on one processor and then process groups 2 and 3 with sub-task 832 on a different processor that would otherwise be idle. Such task scheduling may help balance the processing load amongst available processors.

Although rectangular groups of four macroblocks are discussed above for the purpose of illustration, it is noted that the group size may be smaller or larger than that depicted in FIGS. 8A-8D. It is noted that certain tasks, such as de-blocking 320 may cross slice boundaries. Consequently, the group size may be as small as the block level. The appropriate group size may be determined based on considerations of available memory, data access rate and latency.

In many codecs, there may be no data dependencies between slices. In such cases, tasks may be duplicated for different slices and processed in parallel. For example, where the section size is the same as the slice size, multiple slices may be processed in parallel as shown in FIG. 2. For example, in BD-ROM coding standard, if an AVC stream is coded with level 4.1, each picture has at least 4 slices. For the VCL decoding task 304, motion vector reconstruction task 310 and pixel prediction/reconstruction task 316, the task internal data dependencies are within the slice boundaries. In these cases, each task may be partitioned into multiple sub-tasks with each sub-task boundary being the same as the slice boundary.

In some codecs, a slice may be decoded using intra prediction from decoded samples within the same slice. Alternatively, the slice may be decoded using inter prediction from previously-decoded reference pictures, using at most two motion vectors and reference indices to predict sample values of each block. For the pixel prediction task 316, the data dependencies between macroblocks are only of intra macroblock prediction. Inter prediction may be done independently for each macroblock. For AVC or other video codec standard defined streams, inter prediction can be much more complex that intra prediction. Consequently, it is possible to split the pixel prediction and reconstruction task 316 into an intra prediction task and an inter prediction task. The inter prediction can be done in parallel by multiple processors. The intra prediction may be done as a single task per picture or per slice.

Depending on the input data stream, hardware structure and implementation, the computation loads of each tasks or sub-task may be different. To improver decoder performance with multiple processing units, it is often desirable to keep all the processing units busy. Typically, if task complexities are balanced and there are more active tasks available for scheduling, it is less likely that processing units will be idle. It is possible to increase the number of schedulable tasks by using a smaller section and/or group sizes and/or decoding more pictures in parallel. However, using smaller section and/or group sizes tends to increase sync points and sync overhead. Furthermore, trying to decode more pictures in parallel tends to use more buffer memory. Thus, adjusting group and section size can only be used within certain limitations. It is desirable, therefore, to make the task configuration adaptive to both the processing hardware and the input stream.

Figure 9:
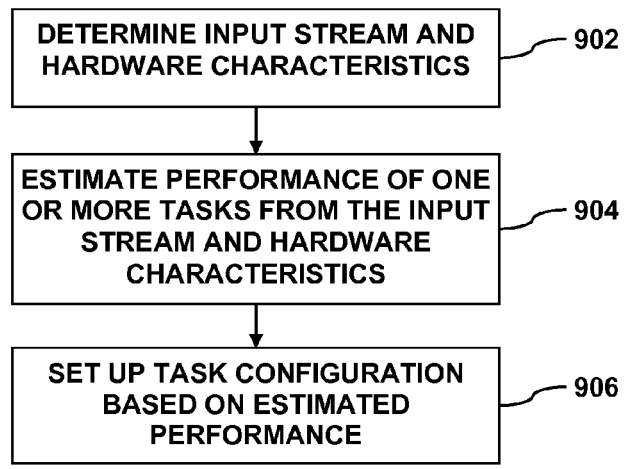
FIG. 9 is a flow diagram illustrating a method for configuration of parallel processing decoding tasks based on characteristics of an input stream and hardware platform according to an embodiment of the present invention.

Balancing task loads tends to yield better performance. For AVC(H.264) stream decoding, the task load depends on the input stream and characteristics of the hardware platform running the decoder. By way of example FIG. 9 depicts an example of a method 900 for configuring task loads for parallel processing of decoding tasks. The method 900 may be implemented as a subroutine within the decoding method 300. At 902, input stream and hardware characterstics are determined. In most cases, the hardware performance of a given functionality may be determined before the decoding process starts. In some embodiments the data stream features related to the computational load may be estimated as part of the NAL decoding task 302. For example, the NAL decoding task 302 may determine the number of macroblocks in each picture, expected picture decoding rate, coded stream profile, coded stream level, number of slices in each picture, the slice coding type, the number of coded bits in each slice and the entropy coding algorithm used. Once the hardware and input stream characteristics have been determined, it is possible to estimate the performance of each task for each picture from these characteristics, as indicated at 904. This may also be done, e.g., as part of the NAL decoding task 302. The performance estimates for each task may then be used to setup the task configuration for the decoding of each picture, as indicated at 906. By way of example, the performance estimates may be used to determine section sizes, group sizes, whether to divide a task into sub-tasks, and the like.

Figure 10:
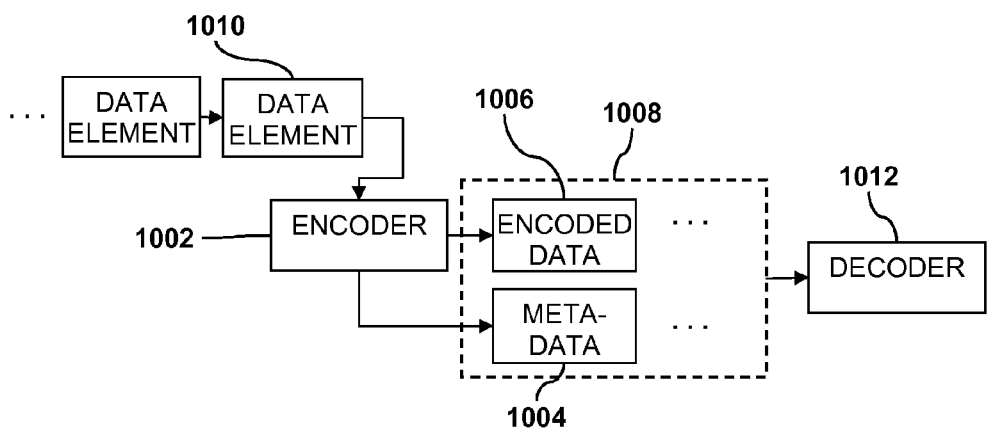
FIG. 10 is a schematic diagram illustrating encoding and decoding of metadata associated with an input stream to facilitate parallel processing according to an embodiment of the present invention.

In some embodiments it may be helpful for statistical information regarding an input stream to be encoded into the input stream. For example, as illustrated in FIG. 10 an encoder 1002 may encode metadata 1004 relating to corresponding data stream elements 1006 (e.g., pictures in the case of a coded video data stream) into an encoded input data stream 1008 as the encoder 1002 generates encoded input data stream 1008 from unencoded data 1010. A decoder 1012 may utilize the metadata 1004 to facilitate balancing of the processing load. By way of example, the metadata 1004 may include statistical information regarding the number of intra macroblocks in a picture or slice so that the decoder can estimate the number of processor cycles required for the pixel prediction/reconstruction task 316. From the number of cycles, the decoder may set the section size. Other examples of the metadata include, but are not limited to the number of skipped macroblocks, the number of blocks having coded DCT coefficients, the number of motion vectors, motion vector range, and the like. With such metadata, the decoder may more accurately configure and schedule the decoding tasks.

The metadata 1004 may thus be sent to a decoder 1012 along with the encoded data stream elements 1006 as part of the input data stream 1008. Pre-generating the metadata 1004 with the encoder can facilitate the process of decoding the input data stream 1008 by the decoder 1012. By way of example, the data stream 1008 may be recorded in a data storage medium such as a CD-ROM, DVD, Blu-Ray disk, etc., that is later loaded into a device that runs the decoder 1012. Alternatively, the input data stream 1008 may be transmitted over a network from a device implementing the encoder 1002 to a device implementing the decoder 1012. The decoder 1012 may decode the input data stream 1008, e.g., as described above with respect to FIG. 3 and utilize the metadata 1004 for task scheduling. The encoder 1002 and decoder 1012 may be implemented in hardware, software or a combination of both hardware and software.

Figure 11:
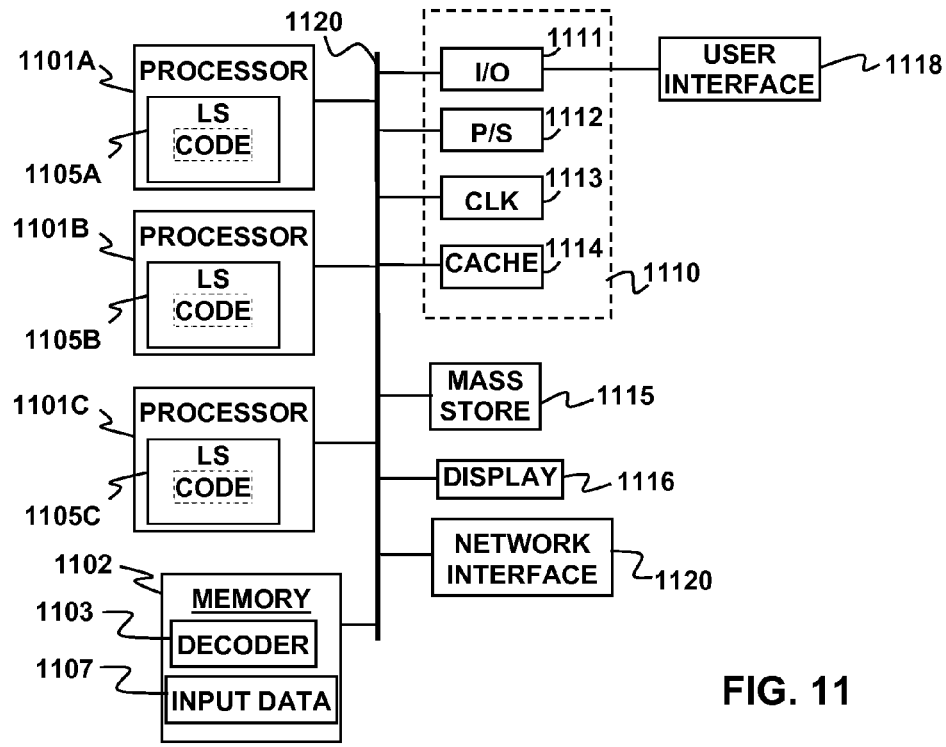
FIG. 11 is a block diagram illustrating an apparatus for implementing streaming data decoding in parallel according to an embodiment of the present invention.

FIG. 11 illustrates a block diagram of a computer apparatus 1100 that may be used to implement parallel decoding of streaming data on three or more processors as described above. The apparatus 1100 generally includes may include three or more processor modules 1101A, 1101B, 1101C and a memory 1102. As an example of a processing system that uses multiple processor modules, the processor modules 1101A, 1101B and 1101C may be components of a Cell processor.

The memory 1102 may be in the form of an integrated circuit, e.g., RAM, DRAM, ROM, and the like. The memory may also be a main memory that is accessible by all of the processor modules 1101. In some embodiments, the processors modules 1101A, 1101B, 1101C may have associated local memories 1105A, 1105B, 1105C. A decoder program 1103 may be stored in the main memory 1102 in the form of processor readable instructions that can be executed on the processor modules 1101. The decoder program 1103 may be configured to decode the compressed signal data, e.g., as described above with respect to FIG. 2, FIG. 3, FIG. 4, FIG. 5, FIG. 6, FIG. 7, FIGS. 8A-8D, FIG. 9 and/or FIG. 10. The program 1103 may be written in any suitable processor readable language, e.g., C, C++, JAVA, Assembly, MATLAB, FORTRAN and a number of other languages. Input data 1107 may be stored in the memory 1102. Such input data may include buffered portions of a streaming data, e.g., encoded video pictures. During execution of the decoder program 1103, portions of program code and/or data 1107 may be loaded into the local stores 1105A, 1105B, and 1105C for parallel processing by the processor modules 1101A, 1101B, 1101C.

The apparatus 1100 may also include well-known support functions 1110, such as input/output (I/O) elements 1111, power supplies (P/S) 1112, a clock (CLK) 1113 and cache 1114. The device 1100 may optionally include a mass storage device 1115 such as a disk drive, CD-ROM drive, tape drive, or the like to store programs and/or data. The device 1100 may also optionally include a display unit 1116 and user interface unit 1118 to facilitate interaction between the apparatus 1100 and a user. The display unit 1116 may be in the form of a cathode ray tube (CRT) or flat panel screen that displays text, numerals, graphical symbols or images. The user interface 1118 may include a keyboard, mouse, joystick, light pen or other device that may be used in conjunction with a graphical user interface (GUI). The apparatus 1100 may also include a network interface 1120 to enable the device to communicate with other devices over a network, such as the internet. These components may be implemented in hardware, software or firmware or some combination of two or more of these.

There are a number of additional ways to streamline parallel processing with multiple processors in the apparatus 1100. For example, it is possible to "unroll" processing loops, e.g., by replicating code on two or more of the processors 1101A, 1101B, 1101C and have each processor implement the code to process a different piece of data. Such an implementation may avoid a latency associated with setting up the loop.

Figure 12:
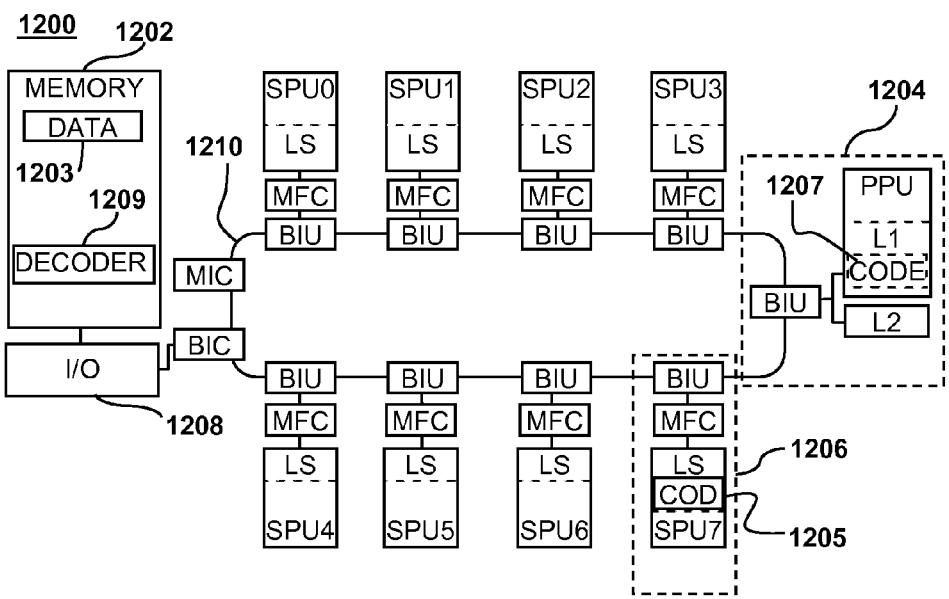
FIG. 12 is a block diagram illustrating an example of a cell processor implementation of a parallel processing streaming data decoder according to an embodiment of the present invention.

One example, among others of a processing system capable of implementing parallel processing on three or more processors is a cell processor. There are a number of different processor architectures that may be categorized as cell processors. By way of example, and without limitation, FIG. 12 illustrates a type of cell processor 1200. The cell processor 1200 includes a main memory 1202, a single power processor element (PPE) 1204 and eight synergistic processor elements (SPE) 1206. Alternatively, the cell processor 1001 may be configured with any number of SPE's. With respect to FIG. 12, the memory 1202, PPE 1204, and SPEs 1206 can communicate with each other and with an I/O device 1208 over a ring-type element interconnect bus 1210. The memory 1202 contains input data 1203 having features in common with the input data 1107 described above and a program 1209 having features in common with the program 1103 described above. At least one of the SPE 1206 may include in its local store (LS) decoding instructions 1205 and/or a portion of the buffered input data that is to be processed in parallel, e.g., as described above. The PPE may include in its L1 cache, code instructions 1207 having features in common with the decoding program 1103 described above. Instructions 1205 and data 1207 may also be stored in memory 1202 for access by the SPE and PPE when needed.

By way of example the PPE 1204 may be 64-bit PowerPC Processor Unit (PPU) with associated caches. The PPE 1204 may include an optional vector multimedia extension unit. Each SPE 1206 includes a synergistic processor unit (SPU) and a local store (LS). In some implementations, the local store may have a capacity of e.g., about 256 kilobytes of memory for code and data. The SPUs are less complex computational units than PPU, in that they typically do not perform any system management functions. The SPUs may have a single instruction, multiple data (SIMD) capability and typically process data and initiate any required data transfers (subject to access properties set up by a PPE) in order to perform their allocated tasks. The SPUs allow the system 1200 to implement applications that require a higher computational unit density and can effectively use the provided instruction set. A significant number of SPUs 1205 in a system, managed by the PPE 1204, allows for cost-effective processing over a wide range of applications.

By way of example, the cell processor 1200 may be characterized by an architecture known as a Cell Broadband engine architecture (CBEA)-compliant processor. In CBEA-compliant architecture, multiple PPEs may be combined into a PPE group and multiple SPEs may be combined into an SPE group. For the purposes of example, the cell processor 1200 is depicted as having only a single SPE group and a single PPE group with a single SPE and a single PPE. Alternatively, a cell processor can include multiple groups of power processor elements (PPE groups) and multiple groups of synergistic processor elements (SPE groups). CBEA-compliant processors are described in detail, e.g., in Cell Broadband Engine Architecture, which is available online and which is incorporated herein by reference.

Embodiments of the invention provide systems and methods for parallel decoding of streaming data, such as encoded streaming video. Such embodiments may be applied to most video decoders, in particular, H.264/AVC decoders and, more particularly, to products that have video decoder as a module. Examples of such products include but are not limited to video game consoles, DVD players, software (PC) video decoder/player, video on cell phones, and the like. In alternative embodiments, such systems and methods may be applied to decoding of streaming data other than video. Examples of such embodiments include systems and methods for decoding streaming audio data, graphic rendering streams, still picture and XML documents.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for decoding streaming data, comprising:
    dividing a process for decoding the streaming data into two or more tasks based on data dependencies between the two or more tasks; and
    executing the two or more tasks in parallel on three or more processors in a way that balances a processing load of executing the two or more tasks among the three or more processors by determining a section size for the streaming data, dividing a portion of the streaming data into two or more sections of the section size and processing the two or more sections in parallel on two or more processors, wherein the section size is chosen such that a hardware clock rate divided by a data transfer latency is greater than a data dependency frequency for the section.

2. The method of claim 1 wherein dividing the process into two or more tasks based on data dependencies includes dividing the process into two or more tasks based on data frequency dependencies between the two or more tasks.

3. The method of claim 1 wherein the streaming data includes one or more pictures, wherein each picture is divided into one or more sections.

4. The method of claim 1, further comprising, adapting the section size to facilitate transferring data across different decoding tasks within the decoding process.

5. The method of claim 1 wherein the section size is chosen such that each section may fit into a memory space available for buffering input data for one of the tasks.

6. The method of claim 1, wherein the streaming data includes one or more pictures, wherein each picture is divided into one or more slices, wherein executing the two or more tasks in parallel on three or more processors includes processing the same task on two or more different slices within the same picture using two or more different processors.

7. The method of claim 1 wherein executing the two or more tasks in parallel on three or more processors in a way that balances the processing load includes overlapping two or more different tasks.

8. The method of claim 7, wherein overlapping two or more different tasks includes overlapping execution of a first task on a first processor with the execution of a second task on second processor.

9. The method of claim 8 wherein the streaming data is video data divided into one or more pictures, wherein each picture is partitioned into n sections, where n is greater than 1.

10. The method of claim 9 wherein the first task is a pixel prediction and reconstruction task and the second task is a de-blocking task.

11. The method of claim 9 wherein overlapping two or more different tasks includes overlapping execution of the first task on a section of one picture with execution of the second task on a different section of a different picture.

12. The method of claim 1 wherein executing the two or more tasks in parallel on three or more processors in a way that balances the processing load includes overlapping two tasks in the same picture and in different pictures by use of picture sections.

13. The method of claim 12 wherein a first processor and a second processor overlap processing of a first task for picture (i−1) and processing of a second task for picture (i) on a section-by-section basis, wherein i is a picture index.

14. The method of claim 13 wherein the second processor and a third processor further overlap processing of the first task for picture (i) with processing of the second task for picture (i) on a section-by-section basis.

15. The method of claim 13 wherein the first task is a pixel prediction and reconstruction task and the second task is a de-blocking task.

16. The method of claim 1 wherein executing the two or more tasks in parallel on three or more processors in a way that balances the processing load includes dividing one or more decoding tasks into two or more sub-tasks and assigning two or more different processors to process the sub-tasks.

17. The method of claim 16 wherein dividing one or more decoding tasks into two or more sub-tasks includes dividing the streaming data into two or more groups and processing each of the two or more groups with a different one of the two or more sub-tasks.

18. The method of claim 17 wherein processing each of the two or more groups with a different one of the two or more sub-tasks includes:
   processing a first group with a first sub-task,
   subsequently processing a second group with the first sub-task in parallel with processing a third group with a second sub-task.

19. The method of claim 18, wherein processing each of the two or more groups with a different one of the two or more sub-tasks further includes:
   processing a fourth group with a third sub-task after completing processing of the second group with the first sub-task and processing the third group with the second sub-task.

20. The method of claim 19 wherein the first, second and third sub-tasks are implemented on different processors.

21. The method of claim 19, further comprising completing processing of first section of the streaming data containing the first group with a first task before processing the first group with the first-sub task, and completing processing of a second section of the streaming data containing the second group with the first task before processing the second group with the second sub-task and completing processing of a third section of the streaming data with the first task before processing the third group with the third sub-task.

22. The method of claim 1 wherein the streaming data is streaming video data.

23. The method of claim 22 wherein the streaming video data has been encoded according to the AVC (H.264) coding standard.

24. The method of claim 22 wherein dividing the process for decoding the streaming data into two or more tasks includes dividing the decoding process into a video coded layer (VCL) decoding task, a motion vector reconstruction task, a pixel prediction/reconstruction task, and a de-blocking task.

25. The method of claim 1, wherein the streaming data is divided into two or more sections, wherein dividing the process for decoding the streaming data into two or more tasks includes dividing the decoding process into one or more producer tasks and one or more consumer tasks wherein each consumer task start after a corresponding producer task has been completed for one section, whereby, a consumer task synchronizes (syncs) only once per section with a producer task or tasks upon which the consumer task depends for input data.

26. The method of claim 1, further comprising receiving a stream of encoded data elements and metadata associated with each encoded data element, wherein executing the tasks in parallel on three or more processors in a way that balances a processing load of executing the two or more tasks among the three or more processors includes utilizing the metadata to facilitate balancing of the processing load.

27. The method of claim 26 wherein the metadata includes statistical information regarding a number of intra macroblocks in a picture or slice.

28. The method of claim 27 wherein utilizing the metadata to facilitate balancing of the processing load includes estimating a number of processor cycles required for one or more tasks and determining a section size or a group size for parallel processing of the streaming data.

29. The method of claim 26 wherein the metadata includes a number of skipped macroblocks, a number of blocks having coded DCT coefficients, the number of motion vectors, or a motion vector range.

30. A video decoder apparatus, comprising:
   three or more processors, wherein each of the three or more processors has a separate dedicated associated local memory; and
   a memory coupled to the three or more processors storing processor readable instructions operable on the three or more processors, the instructions being configured to implement a method for decoding streaming data, the method comprising:
      dividing a process for decoding the streaming data into two or more tasks based on data dependencies between the two or more tasks; and
      executing the two or more tasks in parallel on the three or more processors in a way that balances a processing load of executing the two or more tasks among the three or more processors by determining a section size for the streaming data, dividing a portion of the streaming data into two or more sections of the section size and processing the two or more sections in parallel on two or more processors, wherein the section size is chosen such that a hardware clock rate divided by a data transfer latency is greater than a data dependency frequency for the section.

31. The apparatus of claim 30, wherein the instructions are adapted to decode video streaming data.

32. The apparatus of claim 31 wherein the instructions include instructions configured to operate in parallel on the three or more processors at one or more levels of abstraction for tasks selected from the group consisting of video coded layer (VCL) decoding, motion vector (MV) reconstruction, pixel prediction and reconstruction, and de-blocking.

33. The apparatus of claim 30 wherein each of the processors has an associated local memory, wherein executing the two or more tasks in parallel on the three or more processors includes dividing the streaming data into two or more sections, processing a first section with a first task running on a first processor and buffering an output of the first task in a local memory, wherein the section size is selected such that the output will fit into available space in the local memory.

* * * * *